(12) United States Patent
Jeong et al.

(10) Patent No.: US 9,014,039 B2
(45) Date of Patent: Apr. 21, 2015

(54) METHOD AND DEVICE FOR PERFORMING AND CONTROLLING USER EQUIPMENT MEASUREMENT IN MULTIPLE CARRIER AGGREGATED MOBILE COMMUNICATION SYSTEM

(75) Inventors: Kyeong In Jeong, Suwon-si (KR); Gert Jan Van Lieshout, Apeldoorn (NL); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 13/695,924

(22) PCT Filed: May 4, 2011

(86) PCT No.: PCT/KR2011/003338
§ 371 (c)(1),
(2), (4) Date: Nov. 2, 2012

(87) PCT Pub. No.: WO2011/139091
PCT Pub. Date: Nov. 10, 2011

(65) Prior Publication Data
US 2013/0051274 A1    Feb. 28, 2013

(30) Foreign Application Priority Data

May 4, 2010   (KR) .......................... 10-2010-0041986

(51) Int. Cl.
*H04W 24/00*    (2009.01)
*H04W 36/00*    (2009.01)
*H04L 5/00*    (2006.01)

(52) U.S. Cl.
CPC ........... *H04W 36/0094* (2013.01); *H04L 5/001* (2013.01)

(58) Field of Classification Search
None
See application file for complete search history.

(56) References Cited

U.S. PATENT DOCUMENTS

| 2006/0165188 | A1 | 7/2006 | Wunder et al. | |
| 2010/0014429 | A1* | 1/2010 | Kim et al. | 370/241 |
| 2010/0208707 | A1* | 8/2010 | Hamabe et al. | 370/332 |

FOREIGN PATENT DOCUMENTS

| KR | 10-2006-0115308 A | 11/2006 |
| KR | 10-2009-0095671 A | 9/2009 |

* cited by examiner

*Primary Examiner* — Chi H Pham
*Assistant Examiner* — Shick Hom
(74) *Attorney, Agent, or Firm* — Jefferson IP Law, LLP (57) ABSTRACT

The present invention defines a method for a terminal to perform measurement for neighbor cells efficiently in a mobile communication system capable of carrier aggregation. The present invention is directed to the 3GPP LTE (Long Term Evolution) or 3GPP LTE-A (LTE-Advanced) being discussed in the 3GPP (3rd Generation Partnership Project) system as an exemplary next generation mobile communication system.

14 Claims, 12 Drawing Sheets

METHOD AND DEVICE FOR PERFORMING AND CONTROLLING USER EQUIPMENT MEASUREMENT IN MULTIPLE CARRIER AGGREGATED MOBILE COMMUNICATION SYSTEM

BACKGROUND OF THE INVENTION

1. Field of the Invention

The present invention relates to a mobile communication system and, in particular, to a method and apparatus for performing and controlling measurement of a terminal in a mobile communication system capable of carrier aggregation.

2. Description of the Related Art

Mobile communication systems have developed to provide the subscribers with voice communication services on the move. With the advance of technologies, the mobile communications have been evolved to support high speed data communication services as well as the standard voice communication services. Recently, as one of the next generation mobile communication system, Long Term Evolution (LTE) is on the standardization by the $3^{rd}$ Generation Partnership Project (3GPP). LTE is a technology designed to provide high speed packet-based communication of up to 100 Mbps and standardized almost completely now with the aim at commercial deployment around 2010 timeframe. Meanwhile, unlike voice service, the data service is provided on the resource determined according to the data amount to be transmitted and channel condition. Accordingly, the radio communication system, especially cellular communication, is provided with a scheduler which manages transmission resource allocation in consideration of the required resource amount, channel condition, data amount, etc. This is also the fact in the LTE system, as the next generation mobile communication system, and the scheduler located at the base station manages the transmission resource allocation.

As the LTE standard is on the verge of ratification, discussion is focused on LTE-advanced (LTE-A) with the adoption of various novel techniques to LTE. One of the key technologies adopted to LTE-A is Carrier Aggregation (CA). CA is a technique to use multiple uplink and multiple downlink carriers in data transmission unlike the conventional single carrier transmission performed with one uplink carrier and one downlink carrier. By allocating resource to a terminal on multiple carriers, it is possible to increase the transmission speed/data rate for the terminal.

Figure 1:
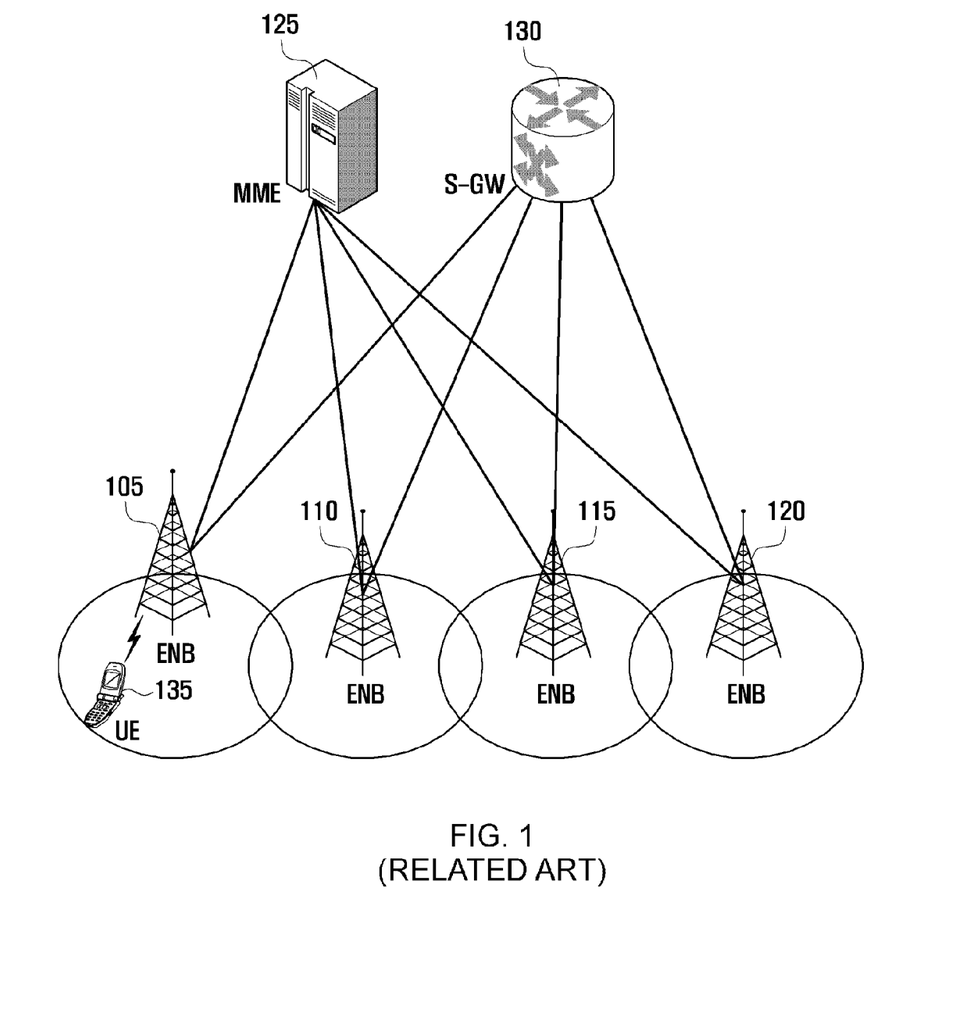
FIG. 1 is a diagram illustrating the architecture of an LTE or LTE-A mobile communication system.

FIG. 1 is a diagram illustrating the architecture of an LTE or LTE-A mobile communication system.

Referring to FIG. 1, the radio access network of an LTE/LTE-A system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology on up to 20 MHz bandwidth. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

Figure 2:
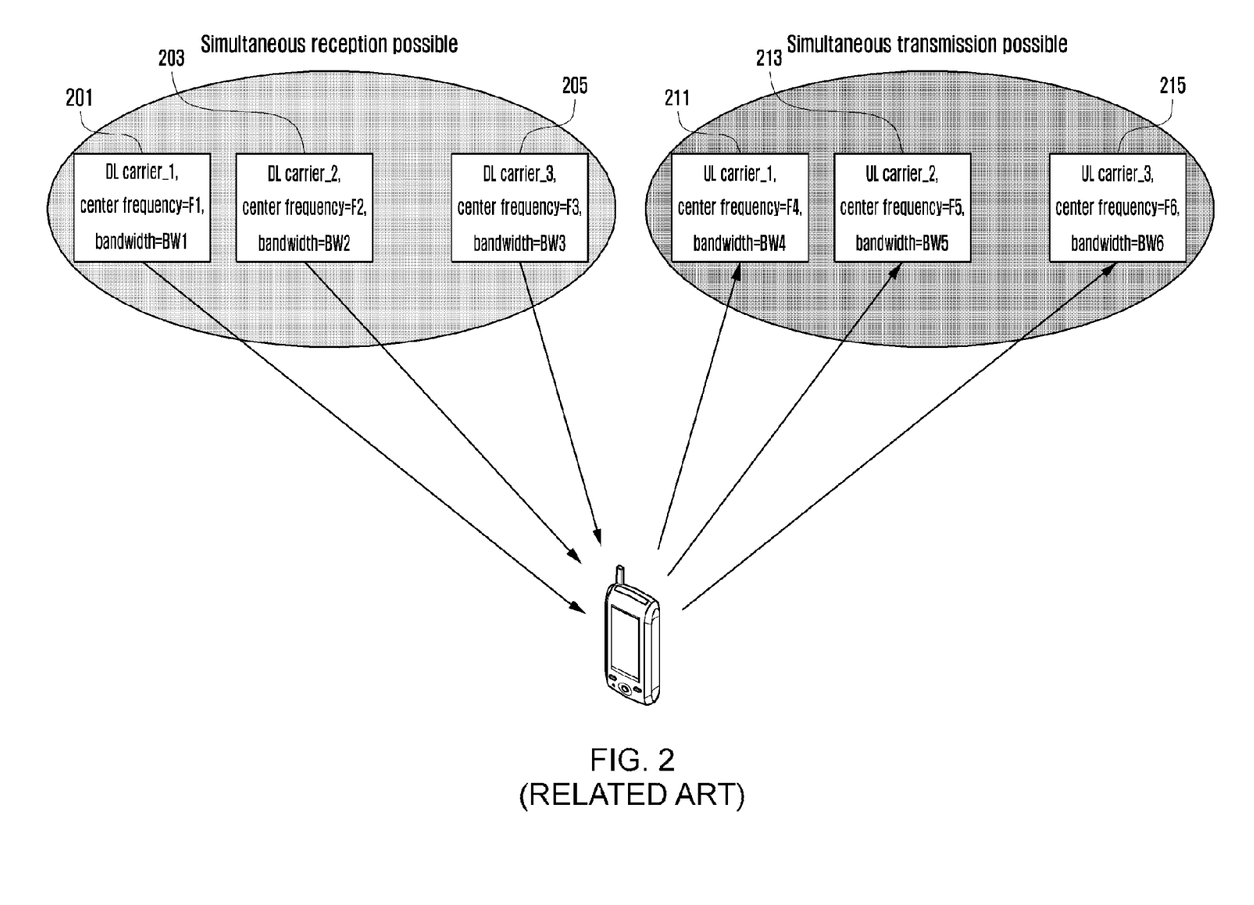
FIG. 2 is a diagram illustrating a protocol stack of the 3GPP LTE/LTE-A system.

FIG. 2 is a diagram illustrating a protocol stack of the 3GPP LTE/LTE-A system.

Referring to FIG. 2, an eNB operates with multiple carriers on different frequency bands for transmission and reception. Assuming downlink carrier_1 201 having its center frequency F1 and bandwidth BW1, downlink carrier_2 203 having its center frequency F2 and bandwidth BW2, and downlink carrier_3 205 having its center frequency F3 and bandwidth BW3; the legacy UE can receive signals on one of these downlink carriers while the UE capable of CA can receive signals on multiple carriers.

That is, the UE capable of CA can receive the signals on the downlink carrier_1, downlink carrier_2, and downlink carrier_3 simultaneously. Likewise, the legacy UE can transmit signals on one of the uplink carriers, while the UE capable of CA can transmit signals the uplink carrier_1 211, uplink carrier_2 213, and uplink carrier_3 215 simultaneously. If necessary, the eNB allocates to the UE capable of CA the more resource on multiple carriers to increase the downlink/uplink transmission speed/data rate. By taking notice that a cell is configured with one downlink carrier and one uplink carrier in a conventional concept, the carrier aggregation can be understood as if the UE communicates data via multiple cells. With the use of carrier aggregation, the maximum data rate increases in proportion to the number of aggregated carriers.

Figure 3:
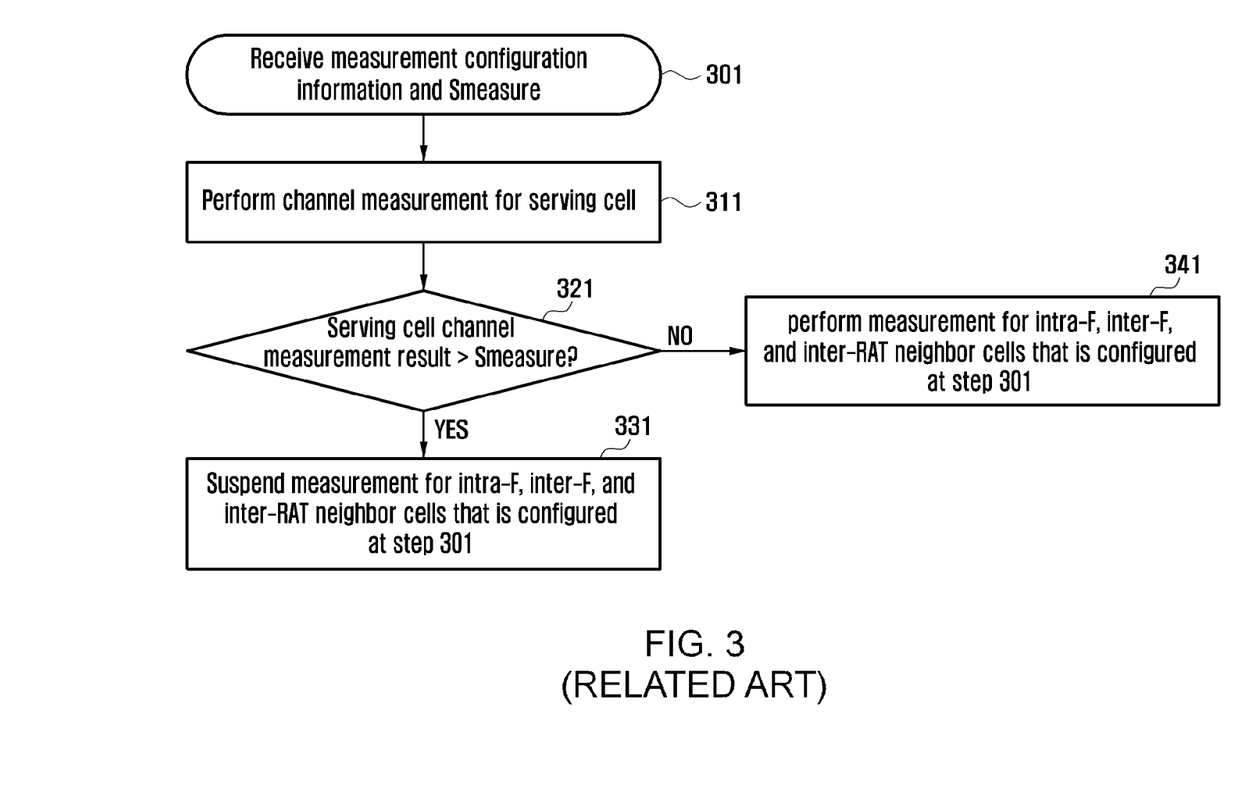
FIG. 3 is a flowchart illustrating the measurement operation of the UE for Smeasure in the conventional 3GPP LTE system.

FIG. 3 is a flowchart illustrating the measurement operation of the UE for Smeasure in the conventional 3GPP LTE system.

Referring to FIG. 3, the Smeasure value is transmitted by the eNB in the message carrying the serving or neighbor cell measurement configuration information. If the Smeasure and intra-Frequency (intra-F) measurement, inter-Frequency (inter-F), and inter-Radio Access Technology (inter-RAT) neighbor cells' measurement configuration information are received at step 301, the UE performs measurement to the serving cell at step 311 and then, if the serving cell's channel measurement result value is greater than Smeasure value at step 321, suspends performing intra-F, inter-F, and inter-RAT neighbor cell measurements at step 331. This is because when the channel condition of the serving cell is good enough there is no need of handover, and thus it is possible to avoid unnecessary measurement to the neighbor cells, resulting in power saving. Otherwise, if the serving cell's channel measurement result value is not greater than Smeasure value at step 321, the UE performs, as configured at step 301, the intra-F, inter-F, and inter-RAT neighbor cell measurements at step 341.

DISCLOSURE OF INVENTION

Technical Problem

The present invention defines the efficient measurement operation in association with Smeasure for achieving improvement in both the power saving and carrier aggregation efficiency of the UE capable of carrier aggregation.

Solution to Problem

In accordance with an aspect of the present invention, a measurement method of a terminal in a mobile communication system including a plurality of cells capable of carrier aggregation for aggregating multiple downlink carriers and multiple uplink carriers includes measuring a channel measurement value of a serving cell of at least one cell on the downlink carriers; measuring, when the channel measurement value is equal to or less than a predetermined threshold value, a channel measurement value for a neighbor cell corresponding to at least one other cells among the cells on the downlink carriers; and suspending, when the channel measurement value is greater than the threshold value, channel measurement for the neighbor cell.

In accordance with another aspect of the present invention, a terminal measurement control method of a base station in a mobile communication system including a plurality of cells capable of carrier aggregation for aggregating multiple downlink carriers and multiple uplink carriers includes generating a measurement configuration information including a threshold value for use in determining whether to perform channel measurement for neighbor cells other than at least one cell of the cells on the downlink carriers which to be, at the terminal, compared with a channel measurement value of the serving cell among the cells on at least one of the downlink carries; and transmitting the measurement configuration information to the terminal, wherein the terminal measures, when the channel measurement value is equal to or less than the threshold value, a channel measurement value for a neighbor cell corresponding to at least one other cells among the cells on the downlink carriers and suspends, when the channel measurement value is greater than the threshold value, channel measurement for the neighbor cell.

In accordance with another aspect of the present invention, a measurement apparatus of a terminal in a mobile communication system including a plurality of cells capable of carrier aggregation for aggregating multiple downlink carriers and multiple uplink carriers includes a storage unit which stores a preconfigured threshold value; a measurement unit which measures a channel measurement value of a serving cell of at least one cell on the downlink carriers and measures, when the channel measurement value is equal to or less than a predetermined threshold value, a channel measurement value for a neighbor cell corresponding to at least one other cells among the cells on the downlink carriers, wherein the measurement unit suspends, when the channel measurement value is greater than the threshold value, channel measurement for the neighbor cell.

In accordance with still another aspect of the present invention, a terminal measurement control apparatus of a base station in a mobile communication system including a plurality of cells capable of carrier aggregation for aggregating multiple downlink carriers and multiple uplink carriers includes a measurement configuration unit which generates a measurement configuration information including a threshold value for use in determining whether to perform channel measurement for neighbor cells other than at least one cell of the cells on the downlink carriers which to be, at the terminal, compared with a channel measurement value of the serving cell among the cells on at least one of the downlink carries; and a transceiver which transmits the measurement configuration information to the terminal, wherein the terminal measures, when the channel measurement value is equal to or less than the threshold value, a channel measurement value for a neighbor cell corresponding to at least one other cells among the cells on the downlink carriers and suspends, when the channel measurement value is greater than the threshold value, channel measurement for the neighbor cell.

Advantageous Effects

According to the present invention,

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 4:
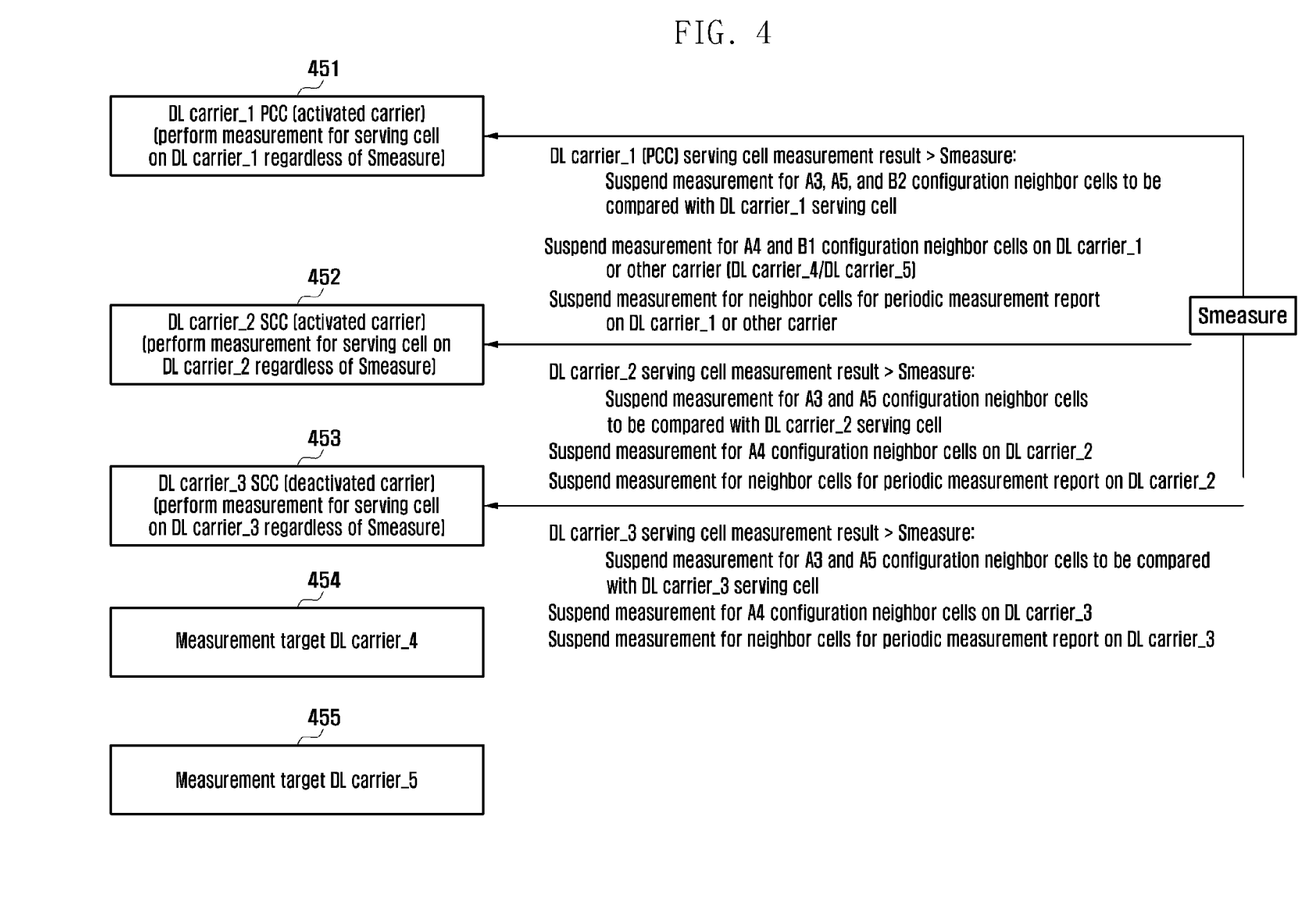
FIG. 4 is a flowchart illustrating Smeasure operation of the UE capable of carrier aggregation according to the first embodiment of the present invention.

FIG. 4 is a flowchart illustrating Smeasure operation of the UE capable of carrier aggregation according to the first embodiment of the present invention.

Referring to FIG. 4, the UE capable of carrier aggregation can use 4 types of carriers: DL carrier_1 451 configured for use in the carrier aggregation as Primary Component Carrier (PCC) for security key input and as reference for UE's mobility and Radio link Failure (RLF) determination, DL carrier_2 452 configured for use in the carrier aggregation and activated as Secondary Component Carrier (SCC) for actual data transmission, DL carrier_3 453 configured for use in the carrier aggregation but deactivated as SCC, and DL carrier_4 454 and DL carrier_5 455 as (inter-frequency or inter-RAT) carriers configured for measurement in handover or Radio Resource Measurement (RRM) procedure regardless of the carrier aggregation. The DL carrier_1, DL carrier_2, and DL carrier_3 have a per-carrier serving cell, and the channel measurement to the serving cells of the DL carrier_1, DL carrier_2, and DL carrier_3 is performed regardless of Smeasure.

For example, if a measurement report event A1/A2 is configured for the serving cells of the respective DL carrier_1, DL carrier_2, and DL carrier_3 or if a periodic measurement result report is configured for the respective serving cells, the channel measurement to the serving cells is performed regardless of Smeasure and the event A1/A2-triggered measurement report or periodic measurement report can be performed according to the result. The measurement report event A1 occurs when the channel measurement result of the serving cell is greater than a predetermined threshold value signaled, and the event A2 occurs when the channel measurement result of the serving cell is less than the predetermined threshold value signaled. For details on the measurement report events A1 and A2, see the 3GPP TS36.331v920 (RRC: Radio Resource Control).

If the measurement result value for the serving cell of the DL carrier_1 is greater than the signaled Smeasure value, it is suspended to perform the measurement for the intra-F/inter-F/inter-RAT neighbor cells and the neighbor cells on the same carrier or other carriers (e.g. DL carrier_4 or DL carrier_5 configured for handover or radio resource management regardless of the carrier aggregation). For example, if the measurement report event A3/A5/B2 for comparing the serving cell of the DL carrier_1 and the intra-F/inter-F/inter-RAT neighbor cells is configured or if the measurement report event A4/B1 for neighbor cells on the same carrier or other carriers is configured or if the periodic measurement report for the neighbor cells, including the serving cell of the DL carrier_1, on the same carrier or other carriers is configured, and if the measurement result value for the serving cell of the DL carrier_1 is greater than the signaled Smeasure value, it is suspended to perform the measurement report event-triggered or periodic measurement for the neighbor cells.

Otherwise, if the measurement result value for the serving cell of the DL carrier_1 is not greater than the signaled Smeasure value, the measurement report event-triggered or periodic measurement is performed for the neighbor cells. The measurement report event A3 is the event triggering the measurement report when the measurement result for a neighbor cell is greater than the measurement result for the serving cell over the signaled offset, the measurement report event A4 is the event triggering the measurement report when the measurement result for an intra-F or inter-F neighbor cell is greater than a signaled threshold value, and the measurement report event A5 is the event triggering the measurement report when the measurement result of an intra-F or inter-F neighbor cell is not greater than a signaled threshold value. The measurement report event B1 is the event triggering the measurement report when the measurement result for the neighbor cell of other system is greater than a signaled threshold value, and the measurement report event B2 is the event triggering the measurement report when the measurement result for the neighbor cell of other system is greater than a signaled threshold value and the measurement result for the serving cell is not greater than the threshold value. For details on the measurement report events A3, A4, A5, B1, and B2, see the 3GPP TS36.331v920 (RRC: Radio Resource Control).

If the measurement result value for the serving cells on the DL carrier_2 or DL carrier_3 is greater than the signaled Smeasure value, the measurement for the neighbor cells to be compared with the serving cell on the DL carrier_2 or DL carrier_3 is not performed. For example, if the measurement report event A3/A5 for comparing the serving cell on the DL carrier_2 or DL carrier_3 with the neighbor cells is configured or if the measurement report event A4 triggering measurement for the neighbor cells on the same carrier or if the period measurement report is configured for the neighbor cell on the same carrier, and if the measurement result value for the serving cell on the DL carrier_2 or DL carrier_3, the measurement report event-triggered and periodic measurement reports are not performed.

Otherwise, if the measurement result value for the serving cell on the DL carrier_2 or DL carrier_3 is not greater than the signaled Smeasure value, the measurement report event-triggered and periodic measurement reports are performed. At this time, the UE operation for comparing the measurement result value for the DL carrier_2 and DL carrier_3 and the Smeasure value is performed per carrier. For example, the UE compares the serving cell measurement result value on the DL carrier_2 with the Smeasure value to determine whether to perform the neighbor cell measurement on the DL carrier_2 and then compares the serving cell measurement result value on the DL carrier_3 with the Smeasure value to determine whether to perform the neighbor cell measurement on the DL carrier_3.

Although FIG. 4 is directed to the case where the same Smeasure value is applied to the DL carrier_2 and DL carrier_3, the present invention include the methods for applying different Smeasure values to the respective DL carrier_1, DL carrier_2, and DL carrier_3, and the method for applying different Smeasure values to the respective measurement report events or measurement report event groups (e.g. group_1 including measurement events A1, A2, and A3 and group_2 including measurement events A4, A5, B1, and B2). In the case of applying different Smeasure values to the respective DL carriers, the Smeasure value has to be signaled per DL carrier such that the channel measurement result of the serving cell per DL carrier is compared with the corresponding Smeasure value. In the case of applying different Smeasure values for the respective measurement report events or measurement report event groups, the Smeasure value has to be signaled per measurement report event or per measurement report event group so as not to perform the event-triggered measurement when the channel measurement result for the serving cell is greater than the Smeasure value of the corresponding event.

Figure 5:
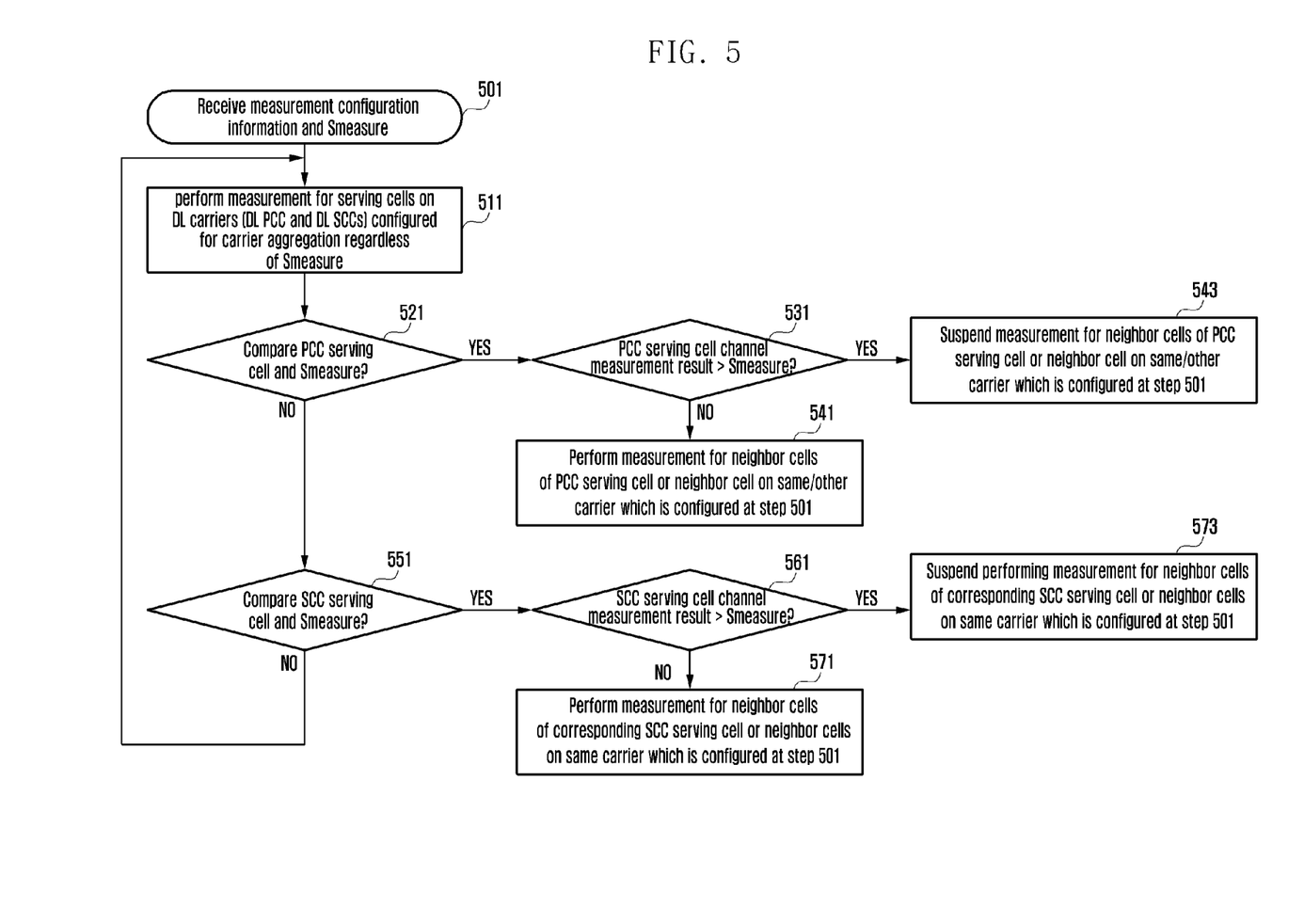
FIG. 5 is a flowchart illustrating the UE operation for carrier aggregation according to the first embodiment of the present invention.

FIG. 5 is a flowchart illustrating the UE operation for carrier aggregation according to the first embodiment of the present invention.

Referring to FIG. 5, if the measurement configuration information and Smeasure are received at step 501, the UE performs measurement to the serving cell of the respective DL carriers (DL PCC, activated DL SCC, and deactivated DL SCC) configured for carrier aggregation regardless of the received Smeasure at step 511. For example, the DL PCC and activated/deactivated DL SCC serving cells are mapped to the measurement report event A1 or A2 or the periodic measurement report.

If the channel measurement result value of the serving cell on the DL PCC carrier is greater than the Smeasure value at steps 521 and 531, the measurement for the neighbor cells to be compared with the DL PCC serving cell configured at step 501 or the measurement for the neighbor cells on the same/other carrier (e.g. other measurement target carriers not configured for carrier aggregation) is not performed at step 543. For example, the measurements may include the measurements triggered by the measurement report events A3, A5, and B2 for the neighbor cells to be compared to the serving cell of the DL PCC carrier or the measurement report events A4 and B1 for the neighbor cells on the same/other carrier (e.g. DL carriers configured for measurement for the purpose of handover or radio resource management regardless of carrier aggregation) or the measurement for periodic measurement report for the neighbor cells on the same/other carrier. Otherwise, if the channel measurement value of the serving cell on the DL PCC carrier is not greater than the Smeasure at step 521 and 531, the UE performs measurement for the neighbor cells to be compared with the DL PCC serving cell configured at step 501 or the neighbor cell measurement on the same/other carrier at step 541.

If the channel measurement result value of the serving cell on the DL SCC carrier is greater than the Smeasure value at step 551 and 561, the UE does not perform the measurement for the neighbor cells to be compared with the DL SCC serving cell configured at step 501 or the measurement for the neighbor cells on the same carrier at step 573. For example, the measurements may include the measurements triggered by the measurement report events A3 and A5 for the neighbor cells to be compared to the serving cell of the DL PCC carrier or the measurement report events A4 for the neighbor cells on the same carrier or the measurement for periodic measurement report for the neighbor cells on the same carrier. Otherwise, if the channel measurement result value of the serving cell on the DL SCC carrier is not greater than the Smeasure at step 551 and 561, the UE performs measurement for the neighbor cells to be compared with the corresponding DL SCC serving cell configured at step 510 or the measurement for the neighbor cells on the same carrier at step 571.

Figure 6:
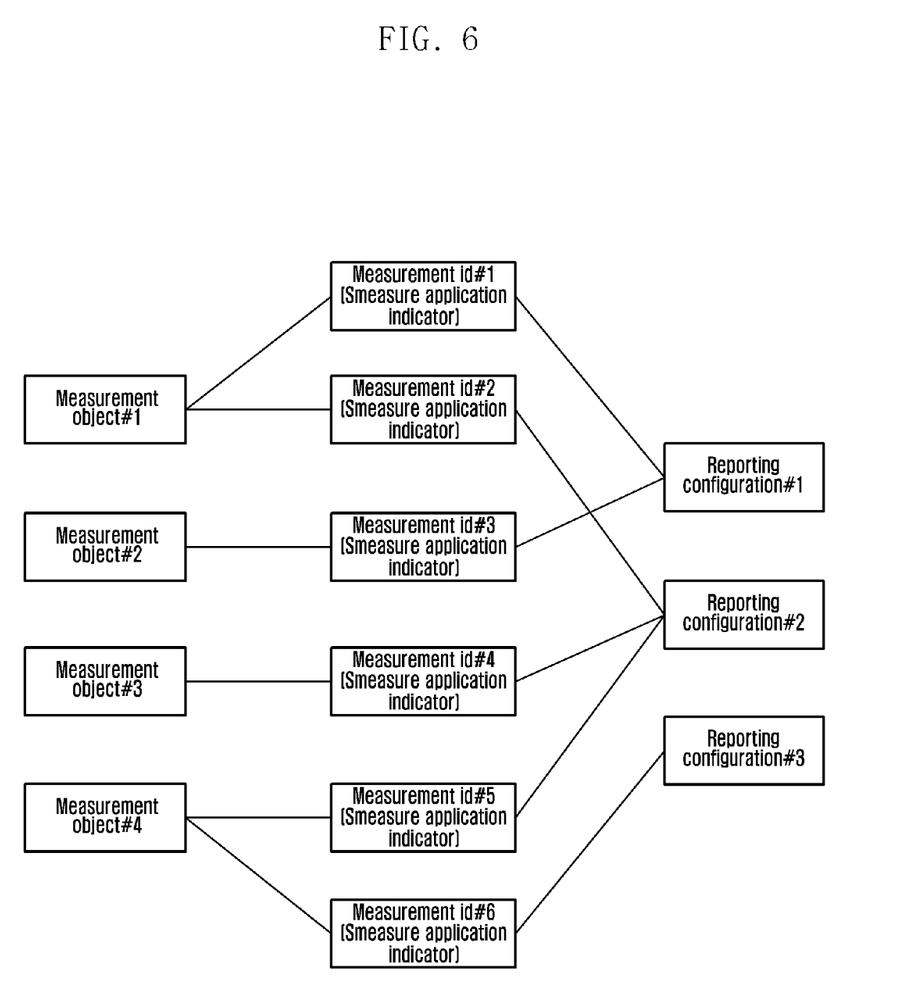
FIG. 6 is a diagram illustrating Smeasure utilization for the UE capable of carrier aggregation according to the second embodiment of the present invention.

FIG. 6 is a diagram illustrating Smeasure utilization for the UE capable of carrier aggregation according to the second embodiment of the present invention.

Referring to FIG. 6, the measurement configuration information configured by the eNB is composed of three elements. The measurement object includes the information on the cells or carrier to be measured. The carrier frequency band and bandwidth information are configured into a measurement object in LTE, while the frequency band and measurement target cells informations are configured into a measurement object in UMTS and CDMA. According to the number of the measurement target carriers or measurement target cell sets, the number of measure objects is determined, and each measurement object has an id. In FIG. 6, 4 measurement objects of measurement object ids 1, 2, 3, and 4 are assumed. The reporting configuration includes the information on the measurement report scheme. For example, the reporting configuration includes the information on the measurement report event configuration or threshold values or offsets necessary for the measurement report event and, in the case of the periodic measurement report, the information on the period. According to the number of the measurement report schemes to be configured, multiple reporting configurations can be configured with respective reporting configuration ids. In FIG. 6, 3 reporting configurations of reporting configuration id 1, 2, and 3. The measurement id maps the measurement target carrier/cell set and measurement report scheme and has unique id.

For example, the measurement id#1 indicates to perform measurement for the measurement object#1 and report the measurement result according to the measurement report scheme of the reporting configuration#1. Likewise, the measurement id#2 indicates to perform measurement for the measurement object#1 and report the measurement result according to the measurement report scheme of the reporting configuration#2. Likewise, the measurement id#3 configures the measurement by mapping the measurement object#2 to the reporting configuration#1, the measurement id#4 configures the measurement by mapping the measurement object #3 to the reporting configuration#2, the measurement id#5 configures the measurement by mapping the measurement object#4 to the reporting configuration#2, and the measurement id#6 configures the measurement by mapping the measurement object#4 to the reporting configuration#3. In FIG. 6, the Smeasure application indicator information is configured per measurement id. That is, the Smeasure application indicator is of indicating whether to apply the rule specifying that the UE compares the measurement result of each of the serving cells on the DL PCC and DL SCC configured for carrier aggregation with the Smeasure value and, if the measurement result of the serving cell is greater than the Smeasure value, does not perform measurement for the neighbor cells for measurement report indicated by the corresponding measurement id and, otherwise if the measurement result of the serving is not greater than the Smeasure value, performs measurement for the neighbor cells for the measurement report indicated by the corresponding measurement id.

For example, if the Smeasure application indicator of the measurement id#1 is set to "true", the UE compares the measurement result of the serving cell of the DL PCC or DL SCC configured for carrier aggregation with the Smeasure value and, if the serving cell measurement result is greater than the Smeasure value, does not perform measurement for the neighbor cells of the measurement object#1 as the measurement target of the measurement id#1 and, otherwise if the serving cell measurement result is not greater than the Smeasure, performs measurement for the neighbor cells of the measurement object#1 to report the measurement result according to the measurement report scheme of the reporting configuration#1. If the Smeasure application indicator of the measurement id#2 is set to "false", the UE performs measurement for the neighbor cells of the measurement object#1 as the measurement target of the measurement id#2 and reports the measurement result according to the measurement report scheme of the reporting configuration#2. The opposite mappings of "true" and "false" are possible according to the rule. Although the Smeasure application indicator information is included in the measurement id in FIG. 6, the present invention includes the method of inserting the Smeasure application indicator information to the measurement object id or the reporting configuration id.

Figure 7:
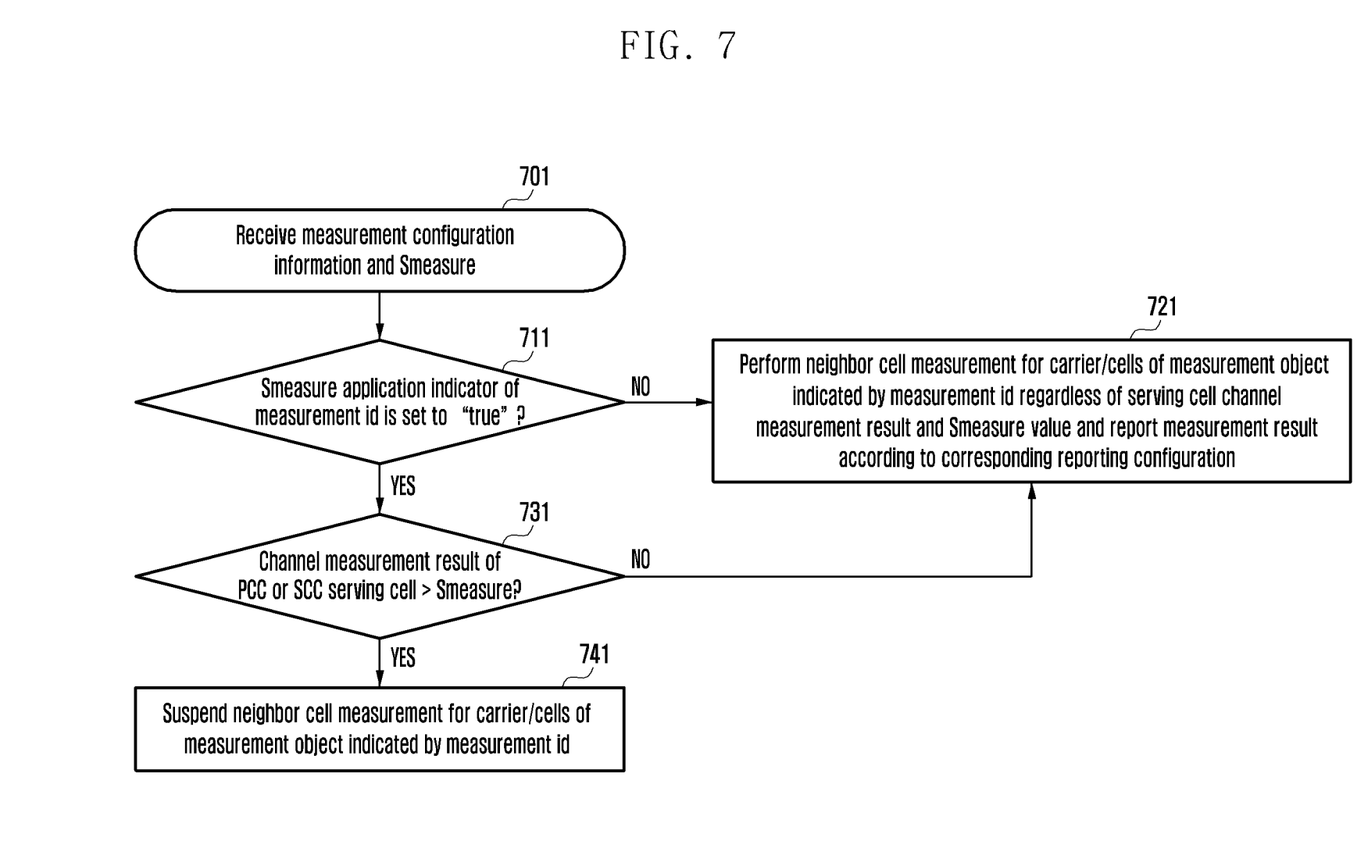
FIG. 7 is a flowchart illustrating the UE procedure for carrier aggregation in association with FIG. 6 according to the second embodiment of the present invention.

FIG. 7 is a flowchart illustrating the UE procedure for carrier aggregation in association with FIG. 6 according to the second embodiment of the present invention.

Referring to FIG. 7, if the measurement configuration information and Smeasure signaled by the eNB are received at step 701, the UE determines whether the Smeasure application indicator of the measurement id is set to "true" at step 711. If the Smeasure of the measurement id is set to "true", the UE performs neighbor cell measurement for the carrier/cells of the measurement object linked to the measurement id and reports the measurement result vale according to the measurement report scheme of the reporting configuration linked to the measurement id regardless of the channel measurement value of the DL PCC or DL SCC serving cell and the Smeasure value at step 721. Otherwise, if the Smeasure application indicator of the measurement id is not set to "true", the UE compares the channel measurement value for the serving cell on the DL PCC or DL SCC with the Smeasure value at step 731 and, if the channel measurement result of the serving cell is greater than the Smeasure value, does not perform the neighbor cell measurement for the carrier/cells of the measurement object linked to the measurement id at step 741. Otherwise, if the channel measurement result of the serving cell is not greater than the Smeasure value, the UE performs neighbor cell measurement for the carrier/cells of the measurement object linked to the measurement id and reports the measurement result value according to the measurement report scheme of the reporting configuration linked to the measurement id at step 721. Although one Smeasure value is used for comparison in FIG. 7, the present invention includes the methods for applying different Smeasure values for the carriers configured for carrier aggregation or the method for applying different Smeasure values for the measurement report events or measurement report event groups (e.g. group_1: measurement event A1, A2, A3; group_2: measurement event A4, A5, B1, B2).

Figure 8:
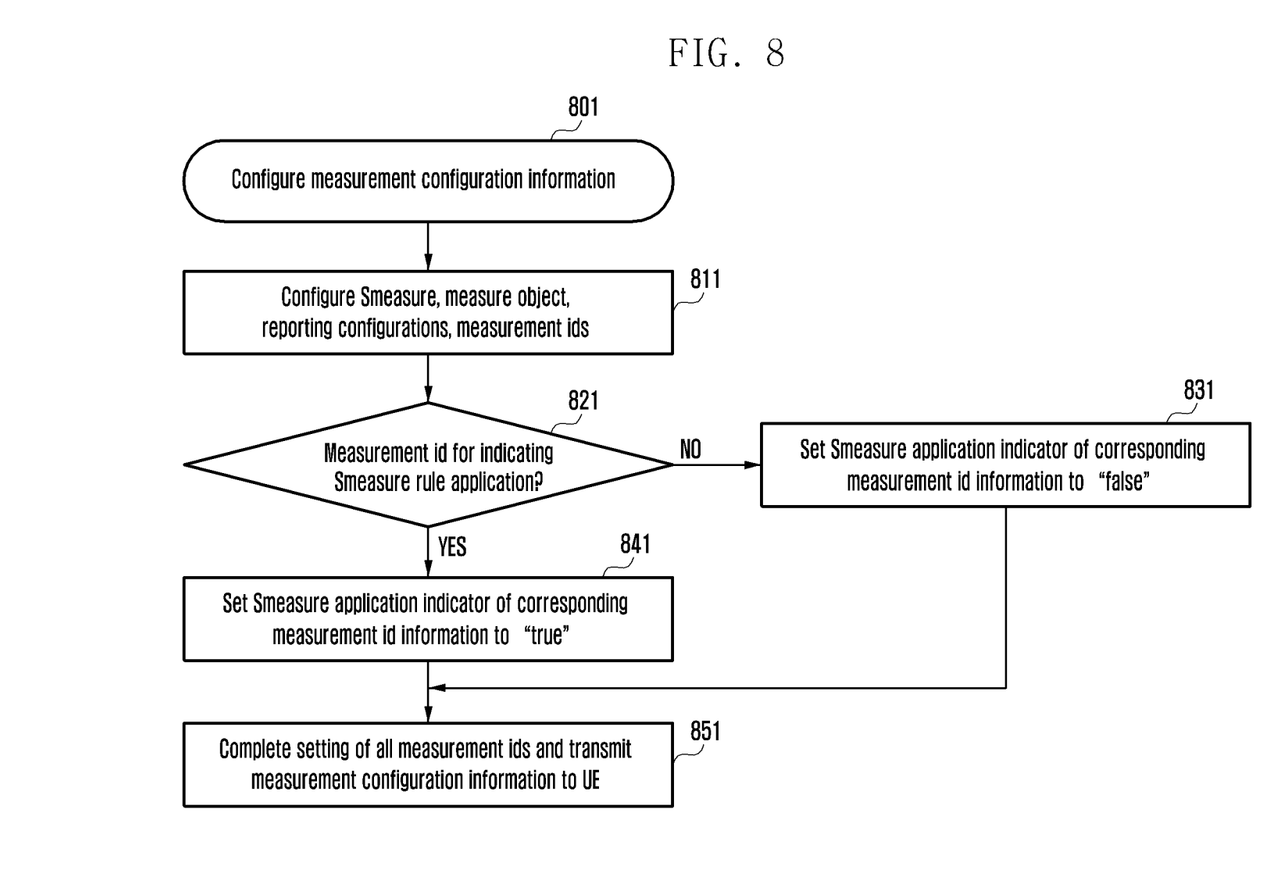
FIG. 8 is a flowchart illustrating the eNB procedure for carrier aggregation in association with FIG. 6 according to the second embodiment of the present invention.

FIG. 8 is a flowchart illustrating the eNB procedure for carrier aggregation in association with FIG. 6 according to the second embodiment of the present invention.

Referring to FIG. 8, if it is required to configure a measurement configuration information for a specific UE at step 801, the eNB configures Smeasure, measurement objects, reporting configurations, and measurement ids information at step 811. If the measurement id requires the application of the Smeasure rule at step 821, the eNB sets the Smeasure application information of the measurement id information to "true" at step 841. Otherwise, if the measurement id does not require the application of the Smeasure rule at step 821, the eNB sets the Smeasure application indicator of the measurement id information to "false" at step 831. If the measurement configurations for all measurement ids are completed, the eNB transmits the measurement configuration information to the UE in UE-specific message at step 851. Although it is depicted that the Smeasure application indication information is included in the measurement id, the present invention also includes the case where the Smeasure application indicator information is included in the measurement object id or the reporting configuration id.

Figure 9:
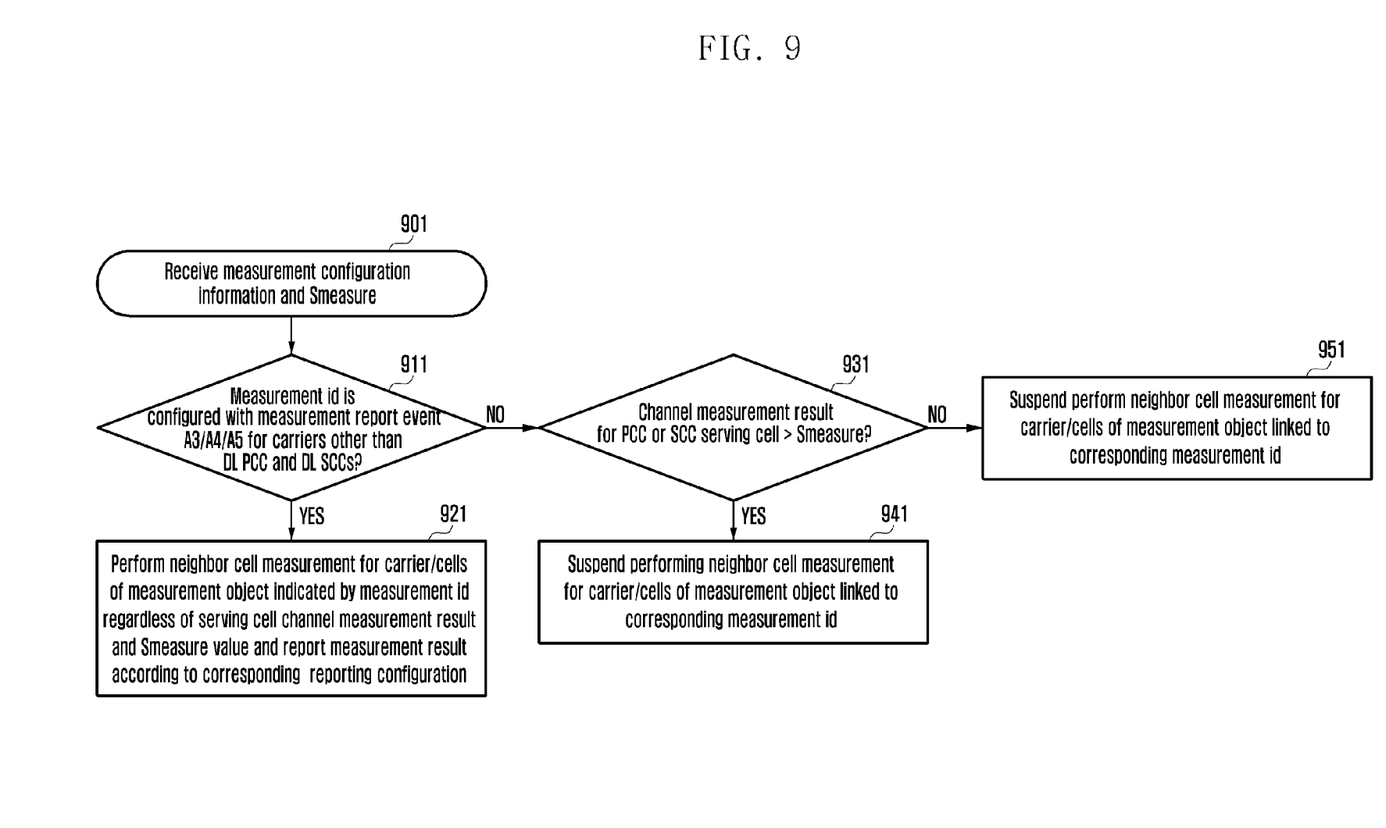
FIG. 9 is a flowchart illustrating the UE procedure for carrier aggregation according to the third embodiment of the preset invention.

FIG. 9 is a flowchart illustrating the UE procedure for carrier aggregation according to the third embodiment of the preset invention. In the present invention, an implicit rule is configured such that the Smeasure is not applied for the measurement report event under a specific condition.

Referring to FIG. 9, when the measurement configuration and Smeasure signaled by the eNB are received at step 901, if the measurement object linked to a specific measurement id is of a carrier other than DL PCC and DL SCCs for carrier aggregation and if measurement report scheme of the measurement configuration linked to the measurement id is of the measurement report event A3/A4/A5 at step 911, the UE performs neighbor cell measurement for the carrier/cells of the measurement object linked to the measurement id regardless of the channel measurement result and Smeasure value of the measured serving cell and report the measurement result according to the measurement report scheme of the reporting configuration linked to the measurement id at step 921. If the measurement id does not fulfills the condition of step 911, the UE compares the measurement result of the serving cell on the DL PCC or DL SCCs with the Smeasure at step 931 and, if the serving cell channel measurement result is greater than the Smeasure value, does not performs neighbor cell measurement for the carrier/cells of the measurement object linked to the measurement id at step 941. If the serving cell measurement result is not greater than the Smeasure value, the UE performs neighbor cell measurement for the carrier/cells of the measurement object liked to the measurement id at step 951. The procedure of FIG. 4 can be applied for the operations of steps 931 to 951. Although not depicted in FIG. 9, even in the case that the measurement object linked to the measurement id is of a carrier other than DL PCC and DL SCCs for carrier aggregation at step 911 and if the measurement report scheme of the reporting configuration linked to the measurement id is the periodic measurement report scheme, the same operation as step 921 can be applied.

Figure 10:
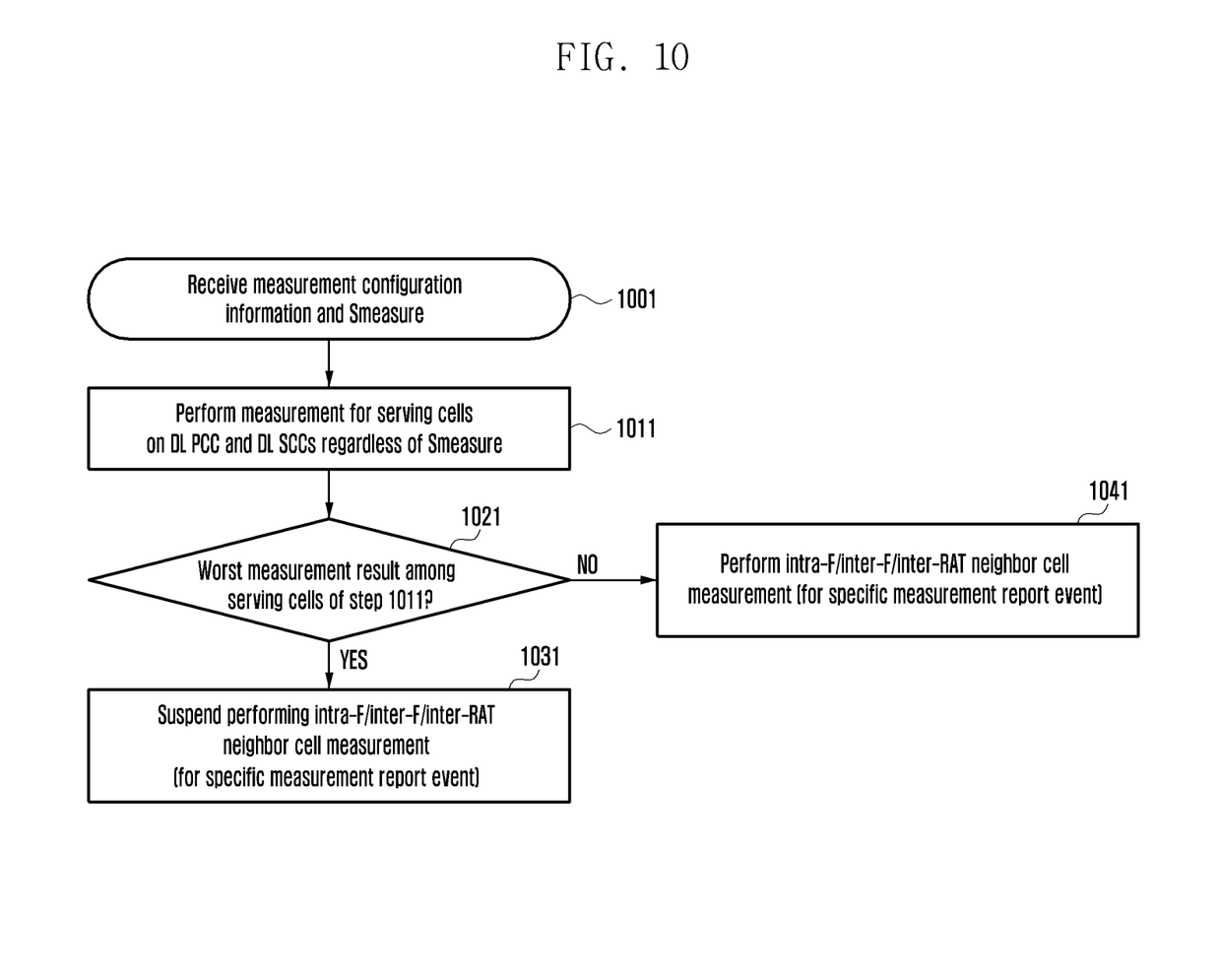
FIG. 10 is a flowchart illustrating a Smeasure application procedure of the UE capable of carrier aggregation according to an embodiment of the present invention.

FIG. 10 is a flowchart illustrating a Smeasure application procedure of the UE capable of carrier aggregation according to an embodiment of the present invention.

Referring to FIG. 10, the UE receives the measurement configuration and Smeasure signaled by the eNB at step 1001 and performs measurement for the serving cells on the DL PCC and DL SCCs at step 1011. The UE compares the worst one of the plural serving cells measurement result values with the Smeasure value at step 1021. If the worst serving cell measurement result value is greater than the Smeasure, the UE does not perform any intra-F/inter-F/inter-RAT neighbor cell measurement at step 1031. It is also possible to suspend the neighbor cell measurement for the carrier/cells configured with a specific measurement report event at step 1031. If the worst serving cell measurement result value is not greater than the Smeasure value, the UE performs intra-F/inter-F/inter-RAT neighbor cell measurement at step 1041.

Figure 11:
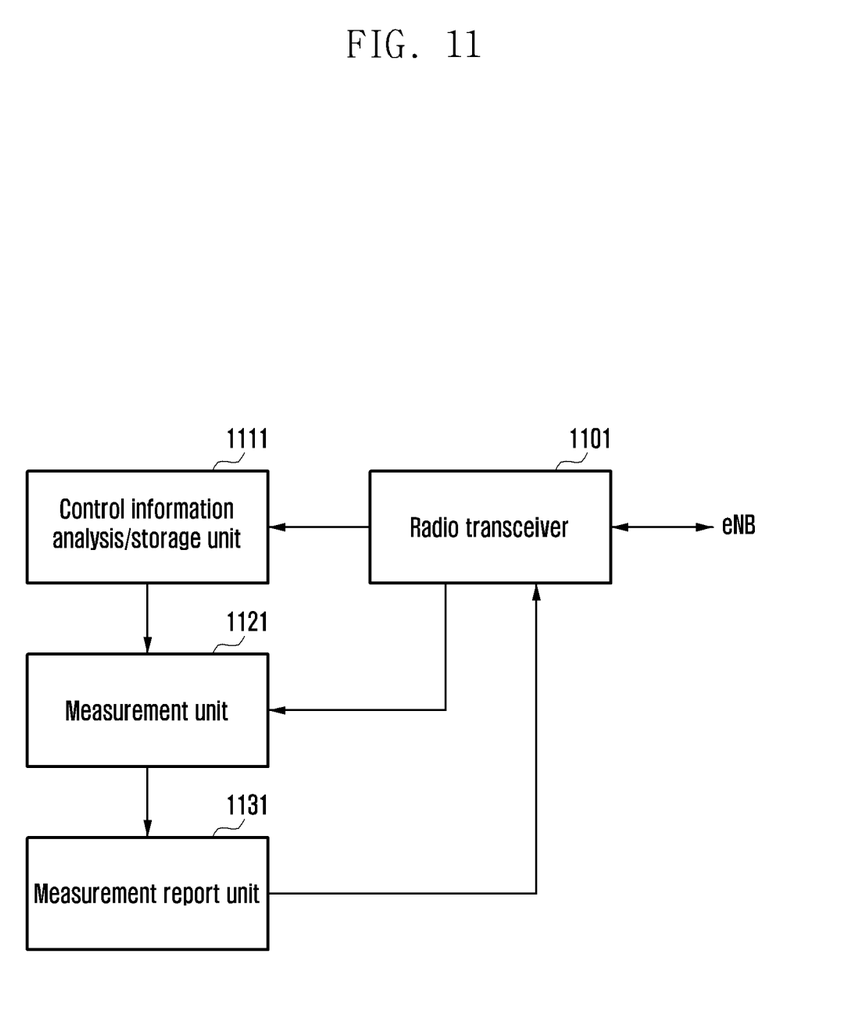
FIG. 11 is a block diagram illustrating a configuration of the UE for the embodiments of the present invention.

FIG. 11 is a block diagram illustrating a configuration of the UE for the embodiments of the present invention.

In FIG. 11, reference number 1101 denotes a radio transceiver responsible for radio communication with the eNB. The measurement configuration control information received by the radio transceiver is analyzed by the control information analysis/storage unit 1111 and stored if necessary. The measurement control information stored in the analysis/storage unit 1111 is input to the measurement unit 1121 for use in selecting the measurement target regardless of the Smeasure, comparing the measurement value of each of the serving cells on the DL PCC and DL SCCs to select the measurement target when the serving cell measurement result is not greater than the Smeasure value. The measurement unit 1121 measures the strength of the pilot channel of the cell. The measurement result value measured by the measurement unit 1121 is reported to the eNB through the measurement report unit 1131.

Figure 12:
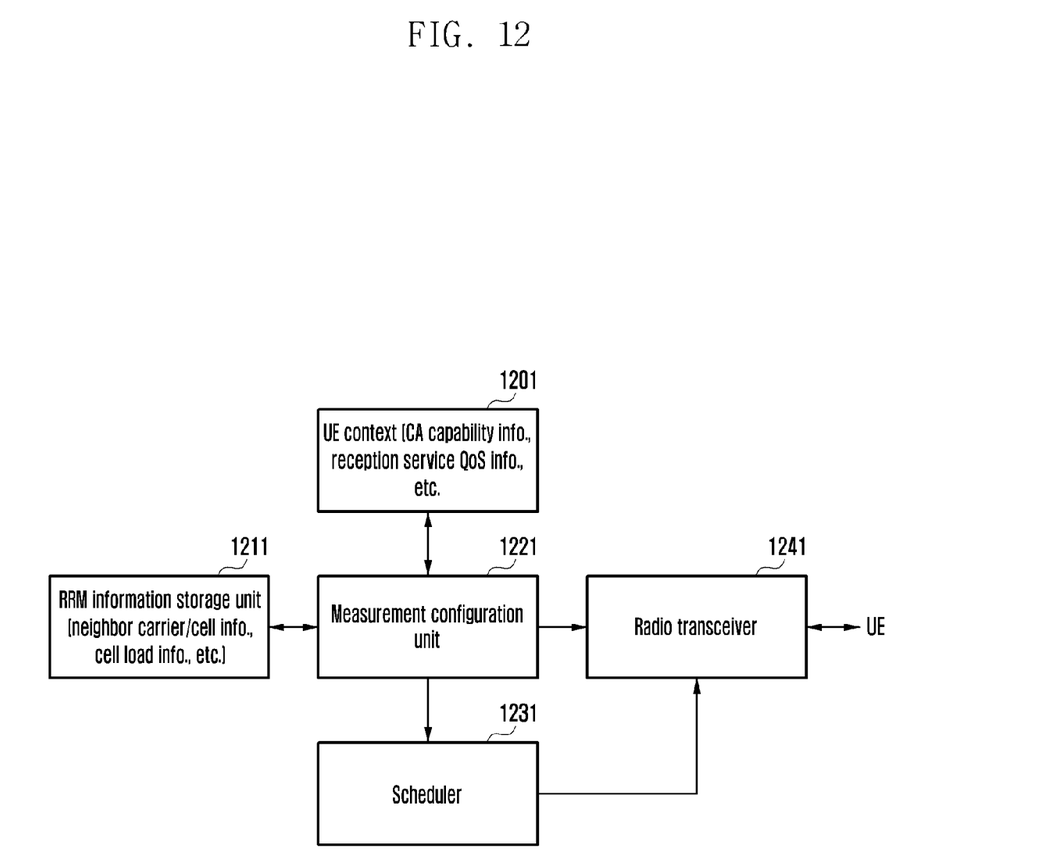
FIG. 12 is a block diagram illustrating a configuration of the eNB for the embodiment of the present invention.

FIG. 12 is a block diagram illustrating a configuration of the eNB for the embodiment of the present invention.

In FIG. 12, reference number 1201 denotes a context storage unit for storing UE's carrier aggregation capability information and QoS information and downlink/uplink transmission/reception data amount information of the reception service. Reference number 1211 denotes a Radio Resource management (RRM) information storage unit for storing the neighbor carrier/cells information and cell load information. Reference number 1221 denotes a measurement configuration unit for configuring UE-specific intra-F/inter-F/inter-RAT measurement and Smeasure value. The measurement configuration can be configured based on the information input by the context storage unit 1201 and the RRM information storage unit 1211. Reference number 1231 denotes a scheduler for determining the transmission resource and timing of UE-specific message including the measurement configuration information configured by the measurement configuration unit 1221. Reference number 1241 is a radio transceiver responsible for radio communication with the UE and transmits the measurement configuration information configured by the measurement configuration unit 1221 with the radio resource and timing determined by the scheduler 1231 to the corresponding UE in the UE-specific message.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A measurement method of a terminal in a mobile communication system including a plurality of cells capable of carrier aggregation for aggregating multiple downlink carriers and multiple uplink carriers, comprises:
   measuring channel measurement values of downlink carriers of serving cells;
   measuring, when at least one of the channel measurement values of the downlink carriers of the serving cells is equal to or less than a predetermined threshold value, a channel measurement value of downlink carrier of a neighbor cell; and
   suspending, when all of the channel measurement values of the downlink carriers of the serving cells are greater than the threshold value, the channel measurement of the downlink carrier of the neighbor cell,
   wherein the neighbor cell is a cell neighboring the serving cells.

2. The measurement method of claim 1, wherein the downlink carriers of the serving cells comprise a primary carrier and a plurality secondary carriers and the measuring of the channel measurement values of the downlink carriers of the serving cells comprises measuring the channel measurement value on one of the primary and secondary carriers.

3. The measurement method of claim 1, wherein the measuring of the channel measurement values of the downlink carriers of the serving cells comprises:
   receiving a measurement configuration information including the threshold value;
   determining whether to apply the threshold value based on an analysis of a carrier identified in the measurement configuration information; and
   measuring, when the threshold value is applied, the channel measurement values of the downlink carriers of the serving cells.

4. The measurement method of claim 3, further comprising when the threshold value is not applied, measuring channel measurement values of the downlink carrier of the neighbor cell.

5. A terminal measurement control method of a base station in a mobile communication system including a plurality of cells capable of carrier aggregation for aggregating multiple downlink carriers and multiple uplink carriers, comprises:
   generating a measurement configuration information including a threshold value for use in determining whether to perform channel measurement of downlink carrier of a neighbor cell other than the downlink carriers of serving cells, at the terminal; and
   transmitting the measurement configuration information to the terminal,
   wherein the threshold value is compared, by the terminal, with at least one of channel measurement values of the downlink carriers of the serving cells, and
   wherein when at least one of the channel measurement values of the downlink carriers of the serving cells is equal to or less than the threshold value, a channel measurement value of downlink carrier of the neighbor cell is measured by the terminal, and when all of the channel measurement values of the serving cells of the downlink carriers are greater than the threshold value, the channel measurement of the downlink carrier of the neighbor cell is suspended by the terminal.

6. The method of claim 5, wherein the generating the measurement configuration information comprises:
   determining whether to apply the threshold value per downlink carrier; and
   configuring the measurement configuration information including information on whether to apply the threshold value.

7. The method of claim 6, wherein the measurement configuration information is analyzed by the terminal to determine whether to apply the threshold value, and
   wherein channel measurement values of the downlink carriers of the serving cells are measured by the terminal when applying the threshold value, and a channel measurement value of the downlink carrier of the neighbor cell is measured by the terminal when not applying the threshold value.

8. A measurement apparatus of a terminal in a mobile communication system including a plurality of cells capable of carrier aggregation for aggregating multiple downlink carriers and multiple uplink carriers, comprises:
   a storage unit which stores a preconfigured threshold value;
   a measurement unit which measures channel measurement values of downlink carriers of serving cells, and measures, when at least one of the channel measurement values of the downlink carriers of the serving cells is equal to or less than a predetermined threshold value, a channel measurement value of downlink carrier of a neighbor cell,
   wherein the measurement unit suspends, when all of the channel measurement values of the downlink carriers of the serving cells are greater than the threshold value, the channel measurement of the downlink carrier of the neighbor cell,
   wherein the neighbor cell is a cell neighboring the serving cells.

9. The measurement apparatus of claim 8, wherein the downlink carriers of the serving cells comprise a primary carrier and a plurality secondary carriers, and the measurement unit measures the channel measurement value on one of the primary and secondary carriers.

10. The measurement apparatus of claim 8, further comprising:
    a transceiver to receive the measurement configuration information including the threshold value; and
    an analysis unit to analyze a carrier identifier of the measurement configuration information and determine whether to apply the threshold value,
    wherein the measurement unit measures, when the threshold value is applied, the channel measurement values of the downlink carriers of the serving cells.

11. The measurement apparatus of claim 10, wherein the measurement unit measures, when the threshold value is not applied, channel measurement values of the downlink carrier of the neighbor cell.

12. A terminal measurement control apparatus of a base station in a mobile communication system including a plurality of cells capable of carrier aggregation for aggregating multiple downlink carriers and multiple uplink carriers, comprises:
    a measurement configuration unit to generate a measurement configuration information including a threshold value for use in determining whether to perform channel measurement of downlink carrier of neighbor cell other than the downlink carriers of serving cells, at the terminal; and a transceiver to transmit the measurement configuration information to the terminal, wherein the threshold value is compared, by the terminal, with at least one of channel measurement values of serving cells of the downlink carriers, and wherein when at least one of the channel measurement values of the downlink carriers of the serving cells is equal to or less than the threshold value, a channel measurement value of downlink carrier of the neighbor cell is measured by the terminal, and when all of the channel measurement values of the downlink carriers of the serving cells are greater than the threshold value, the channel measurement of the downlink carrier of the neighbor cell is suspended by the terminal.

13. The terminal measurement control apparatus of claim 12, wherein the measurement configuration unit determines whether to apply the threshold value per downlink carrier and configures the measurement configuration information including information on whether to apply the threshold value.

14. The terminal measurement control apparatus of claim 13, wherein the measurement configuration information is analyzed by the terminal to determine whether to apply the threshold value, and wherein channel measurement values of the downlink carriers of the serving cells are measured by the terminal when applying the threshold value, and channel measurement value of the downlink carrier of the neighbor cell is measured by the terminal when not applying the threshold value.

* * * * *